(12) United States Patent
Yoda et al.

(10) Patent No.: US 7,702,884 B2
(45) Date of Patent: Apr. 20, 2010

(54) SEMICONDUCTOR INTEGRATED CIRCUIT WITH SELECTED SIGNAL LINE COUPLING

(75) Inventors: Katsuhiro Yoda, Kawasaki (JP); Iwao Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/147,173

(22) Filed: Jun. 8, 2005

(65) Prior Publication Data

US 2006/0155969 A1    Jul. 13, 2006

(30) Foreign Application Priority Data

Jan. 11, 2005    (JP)    ............................. 2005-004403

(51) Int. Cl.
*G06F 15/00*    (2006.01)

(52) U.S. Cl. ........................................ 712/15; 712/226

(58) Field of Classification Search ................. 712/226, 712/15; 709/221; 710/104; 713/100
See application file for complete search history.

(56) References Cited

U.S. PATENT DOCUMENTS

| | | | | |
|---|---|---|---|---|
| 5,361,373 A | * | 11/1994 | Gilson | 712/1 |
| 5,542,074 A | * | 7/1996 | Kim et al. | 712/22 |
| 5,752,035 A | * | 5/1998 | Trimberger | 717/153 |
| 6,034,538 A | * | 3/2000 | Abramovici | 326/38 |
| 6,052,773 A | * | 4/2000 | DeHon et al. | 712/43 |
| 6,150,837 A | | 11/2000 | Beal et al. | |
| 6,356,109 B1 | * | 3/2002 | Furuta et al. | 326/41 |
| 6,721,884 B1 | * | 4/2004 | De Oliveira Kastrup Pereira et al. | 713/2 |
| 6,785,165 B2 | | 8/2004 | Kawahara et al. | |
| 6,791,353 B1 | | 9/2004 | Beal et al. | |
| 6,823,505 B1 | * | 11/2004 | Dowling | 717/140 |
| 2004/0088527 A1 | * | 5/2004 | Huppenthal et al. | 712/226 |
| 2005/0097305 A1 | * | 5/2005 | Doering et al. | 712/226 |

FOREIGN PATENT DOCUMENTS

| | | |
|---|---|---|
| JP | 10-56376 A | 2/1998 |
| JP | 11-15866 A | 1/1999 |
| JP | 2000-509948 A | 8/2000 |
| JP | 2003-218212 A | 7/2003 |
| JP | 2004-153800 A | 5/2004 |

* cited by examiner

*Primary Examiner*—Eddie P Chan
*Assistant Examiner*—William B Partridge
(74) *Attorney, Agent, or Firm*—Arent Fox LLP

(57) ABSTRACT

A semiconductor integrated circuit includes a reconfigurable circuit including a plurality of computing units interconnected in a reconfigurable manner, a processing circuit including at least one of a fixed logic circuit configured to perform predetermined processing and a parameter-defined special-purpose hardware unit configured to change processing specifications according to parameter settings, a network having reconfigurable connections and coupled to the reconfigurable circuit and to the processing circuit, and at least two interfaces each coupled to the network to provide external coupling for the network.

9 Claims, 15 Drawing Sheets

SEMICONDUCTOR INTEGRATED CIRCUIT WITH SELECTED SIGNAL LINE COUPLING

The present application claims the priority of Japanese Patent Application No. 2005-004403 that was filed on Jan. 11, 2005 in the Japan Patent Office, which is incorporated in its entirety by reference herein.

BACKGROUND OF THE INVENTION

1. Field of the Invention

The present invention generally relates to semiconductor integrated circuits, and particularly relates to a reconfigurable semiconductor integrated circuit.

2. Description of the Related Art

In the field of communication, a software-defined radio provides for most of the processing relating to the communication system to be implemented based on software, thereby making it possible for a single radio transceiver to cope with various radio communication methods using different modulation schemes. Rewriting of the software achieves the updating of a communication method. When a new communication method emerges, new software is installed, thereby updating the device so as to cope with the new communication method without replacing the hardware.

In any fields, not limited to the field of communication, the use of a special-purpose LSI generally makes it possible to implement a high performance system that can perform a predetermined process with low power consumption. When there is a need to change the specifications to perform a different process, however, all the designing and manufacturing need to be redone. In this manner, special-purpose LSIs are extremely ill-suited for changing of specifications.

Configurations that are highly suitable for the changing of specifications include a system in which the processor executes software, and specifications are changed by rewiring the software. This configuration provides extremely high reconfigurability. However, since processors are designed to perform general-purpose processing and thus have high redundancy, their performance is rather low.

A technology that provides reconfigurability and yet provides hardware-based processing includes a FPGA (field programmable gate array). FPGAs provide for reconfiguration to be effected on a gate-by-gate basis by making connections between logic elements freely reconfigurable based on the reconfiguration data stored in memory. Since FPGAs have large hardware redundancy, their size may be 10 times as large as the special-purpose LSIs (Large Scale Integrations) in terms of the scale of circuits, resulting in increased costs and power consumption. Compared with special-purpose LSIs, further, FPGAs have rather low processing speed.

Recently, attention has been drawn to dynamic reconfigurable LSIs (dynamically reconfigurable semiconductor integrated circuits), which provide reconfigurable circuits, and yet provide high processing performance. In dynamic reconfigurable LSIs, a plurality of computing units are arranged in an array, and buses arranged in rows and columns connect these computing units with each other. Around the array of the computing units are provided a configuration memory for storing configuration information regarding the array of the computing units and a control unit for controlling the dynamic switching of configurations.

In such dynamic reconfigurable LSIs, a basic unit of reconfiguration is a computing unit, which has a far larger granularity (the size of the reconfigurable unit) compared with a single gate or the like which is a basic unit of reconfiguration in FPGAs. Further, the provision of the computing units in an array structure makes it possible to perform parallel processing, thereby enabling to perform heavy computation such as complex-number computation or sum-of-product computation at high speed.

In the field of a software-defined radio, the use of reconfigurable circuits such as FPGAs and/or dynamic reconfigurable LSIs makes it possible to provide various communication methods in a reconfigurable fashion. Dynamic reconfigurable LSIs exhibit high performance on heavy computations, but have large granularity, which creates a drawback in that it is difficult to efficiently achieve diligent control such as conditional branching based on decoded results, for example. On the other hand, it is easy to use FPGAs to implement diligent control because of their small granularity. FPGAs are, however, not satisfactory in terms of computation speed.

Accordingly, there is a need for a reconfigurable semiconductor integrated circuit that can provide high performance both on diligent control and on heavy computation.

SUMMARY OF THE INVENTION

It is a general object of the present invention to provide a semiconductor integrated circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages in accordance with the purpose of the invention, the invention provides a semiconductor integrated circuit, which includes a reconfigurable circuit including a plurality of computing units interconnected in a reconfigurable manner, a processing circuit including at least one of a fixed logic circuit configured to perform predetermined processing and a parameter-defined special-purpose hardware unit configured to change processing specifications according to parameter settings, a network having reconfigurable connections and coupled to the reconfigurable circuit and to the processing circuit, and at least two interfaces each coupled to the network to provide external coupling for the network.

According to additional aspect of the present invention, the semiconductor integrated circuit described above further includes, in addition to a set of the reconfigurable circuit, the processing circuit, and the network, one or more sets of another reconfigurable circuit, another processing circuit, and another network, wherein the network of the set and the networks of the one or more sets are connected in series through the interfaces, and the networks situated at opposite ends of the series are connectable to an exterior of the semiconductor integrated circuit through the interfaces.

According to at least one embodiment of the present invention, the semiconductor integrated circuit described above can easily control the processing that requires diligent control by use of the logic circuit, and can achieve high speed computation for heavy processing such as complex-number computation or sum-or-product computation by use of the reconfigurable circuit and the parameter-defined special-purpose hardware unit. Further, it is possible to increase the number of processing sets provided in the semiconductor integrated circuit without making design changes, and it is also possible to increase the total number of processing sets by connecting the chips of the semiconductor integrated circuits together. Such an increase in the number of processing sets can boost total processing capability according to need.

BRIEF DESCRIPTION OF THE DRAWINGS

Other objects and further features of the present invention will be apparent from the following detailed description when read in conjunction with the accompanying drawings, in which:

FIG. 4 is a block diagram showing the configuration of receiver functions according to IEEE802.11a;

FIG. 5 is a block diagram showing the configuration of transmitter functions according to IEEE802.11a;

DESCRIPTION OF THE PREFERRED EMBODIMENTS

In the following, embodiments of the present invention will be described with reference to the accompanying drawings.

Figure 1:
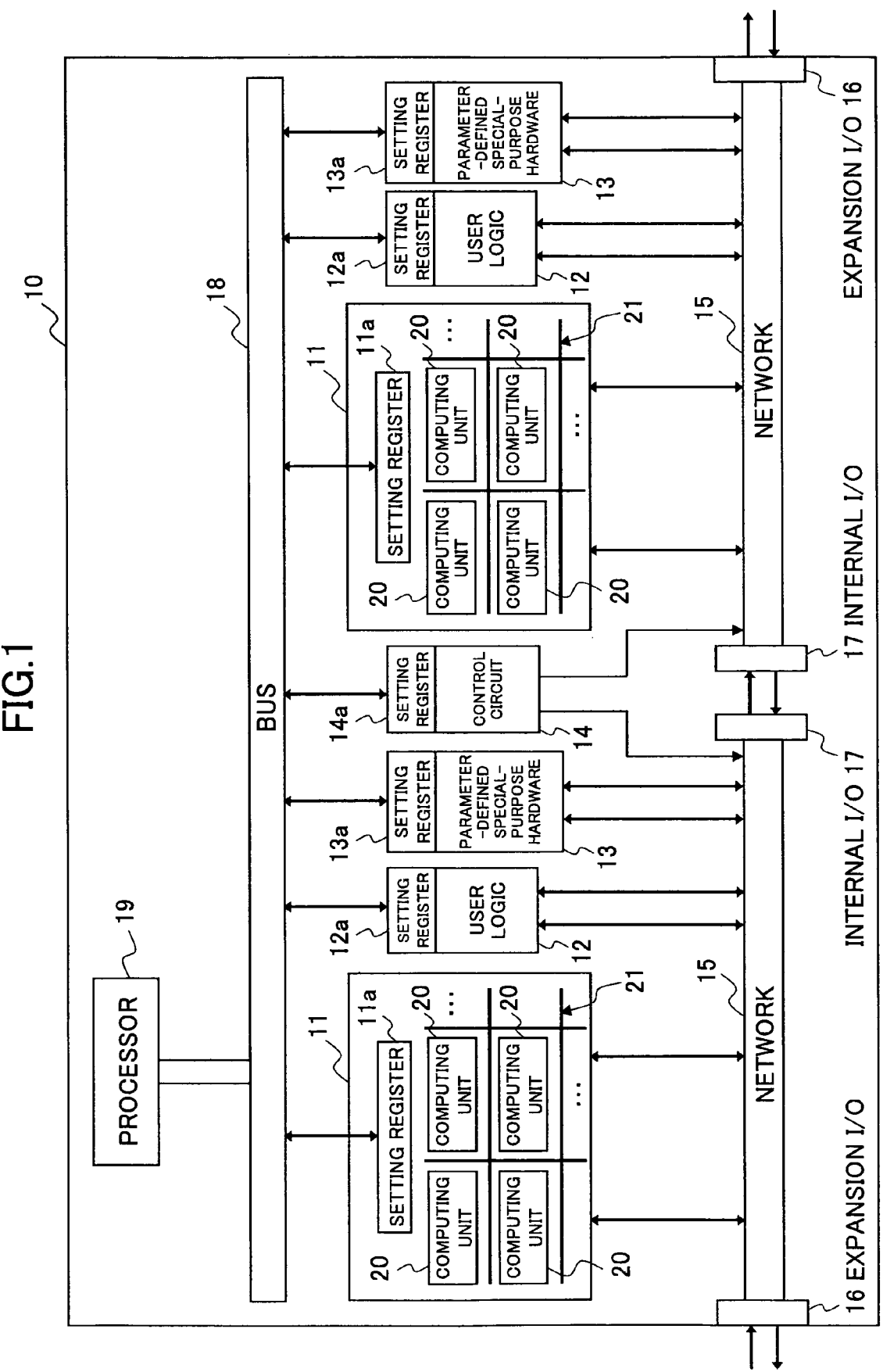
FIG. 1 is a block diagram showing an example of the configuration of a semiconductor integrated circuit according to the present invention.

FIG. 1 is a block diagram showing an example of the configuration of a semiconductor integrated circuit according to the present invention. A semiconductor integrated circuit 10 of FIG. 1 includes dynamic reconfigurable circuits 11, user logic units 12, parameter-defined special-purpose hardware units 13, a control circuit 14, networks 15, expansion I/Os 16, internal I/Os 17, a bus 18, and a processor 19.

In the configuration shown in FIG. 1, the semiconductor integrated circuit 10 includes, in its chip, two processing sets, each of which is comprised of a dynamic reconfigurable circuit 11, a user logic unit 12, a parameter-defined special-purpose hardware unit 13, and a network 15. The number of such processing sets is not limited to two, and one processing set or three or more processing sets may be provided in a single chip. When a plurality of processing sets are provided in a single chip, adjacent processing sets are coupled to each other through internal I/Os 17 as shown in FIG. 1.

The dynamic reconfigurable circuit 11 includes a plurality of computing units 20 arranged in an array comprised of rows and columns, buses 21 extending in row and column directions to connect the computing units 20, and a setting register 11a for storing configuration information regarding the array of the computing units 20. Configuration information is written to the setting register 11a by the processor 19 through the bus 18, thereby making it possible to cause the array of the computing units 20 to perform desired data processing.

The user logic unit 12 is special-purpose hardware for performing a specific process, and includes a setting register 12a. The user logic unit 12 may be provided with a plurality of hardware functions corresponding to a plurality of processes that it performs. The processor 19 sets data in the setting register 12a via the bus 18, thereby controlling the operating conditions and the like of the user logic unit 12.

The parameter-defined special-purpose hardware unit 13 is specifically designed and manufactured for the purpose of performing predetermined processing. What processing it is that the parameter-defined special-purpose hardware unit 13 performs cannot be changed, but parameters such as those for defining precision and the number of processed data items can be changed. Such parameter information is stored in a setting register 13a. The processor 19 stores these parameters in the setting register 13a via the bus 18, thereby making it possible for the parameter-defined special-purpose hardware unit 13 to perform the predetermined operation according to the desired specifications.

The parameter-defined special-purpose hardware unit 13 may be a band-limiting filter, for example, and the changeable parameters include the filter coefficients and the number of taps. The parameter-defined special-purpose hardware unit 13 may be an FFT (Fast Fourier Transform) computing unit, for example, and the changeable parameters include the number of points for which the FFT computation is performed. The parameter-defined special-purpose hardware unit 13 may be a Viterbi decoder, for example, and the changeable parameters include a constraint length, a coding rate, and a generator polynomial.

The control circuit 14 controls connections of signal lines of the networks 15, thereby achieving desired interconnections between the dynamic reconfigurable circuit 11, the user logic unit 12, and the parameter-defined special-purpose hardware unit 13 (i.e., between the processing macros). Further, the control circuit 14 controls connections of the signal lines of the network 15, thereby achieving desired interconnections between the adjacent processing sets. Information about the connections of the signal lines of the network 15 is stored in a setting register 14a. The processor 19 stores the information about the signal connections in the setting register 13a via the bus 18, thereby setting reconfigurable interconnections in a desired manner between the processing macros provided in the semiconductor integrated circuit 10.

The network 15 may be configured as a crossbar that can couple any one point on the input side to any desired point on the output side. With this provision, it is possible to supply any desired output to any desired input among the inputs and outputs of the processing macros connected to a network 15. The two adjacent networks 15 are connected to each other via the internal I/Os 17. With this provision, it is possible to exchange signals between the processing macros connected to one network 15 and the processing macros connected to the other network 15.

If all the signal lines of one network 15 are coupled to the adjacent network 15, provision of n processing sets results in the number of signal lines of a network 15 being n times as many as the signal lines provided when a single processing set is provided. Such configuration is no different from a configuration in which processing macros for n sets are interconnected through a single network 15.

In the present invention, thus, provision is made to couple only selected ones of the signal lines of one network 15 to an adjacent network 15. With this provision, the number of signal lines provided when n processing sets are provided can be kept to a small number that is not much different from the number of signal lines provided when a single processing set is provided. Accordingly, a desired number of processing sets can be provided in the semiconductor integrated circuit 10 while avoiding an undesirable increase in the number of signal lines of the network.

Further, provision is made such that the networks 15 can communicate with an exterior of the semiconductor integrated circuit 10 via the two expansion I/Os 16. With this provision, it is possible to connect a desired number of semiconductor integrated circuits 10 each identical to the one shown in FIG. 1, thereby making it possible to readily provide a desired performance level according to need. The interconnection between chips through the expansion I/Os 16 may be achieved in the same manner as in the interconnections within a chip via the internal I/Os 17 by coupling only selected ones of the signal lines of a network 15 to an exterior of the chip.

The semiconductor integrated circuit 10 having the configuration as described above can easily implement the processing that requires diligent control by use of the user logic units 12, and can achieve high speed computation by use of the dynamic reconfigurable circuits 11 and the parameter-defined special-purpose hardware units 13. Further, it is possible to increase the number of processing sets provided in the semiconductor integrated circuit 10 without making design changes, and it is also possible to increase the total number of processing sets by connecting the chips of the semiconductor integrated circuits 10 together. Such an increase in the number of processing sets can boost total processing capability according to need. Further, such expandability in terms of the number of processing sets may provide an available computation resource in the dynamic reconfigurable circuits 11 that can be used to perform the processing that requires diligent control.

In the configuration that has been described above, the dynamic reconfigurable circuits 11 each comprised of a plurality of computing units are the only units that are reconfigurable. Alternatively, any desired reconfigurable circuits such as FPGAs may be provided in addition to or in place of the dynamic reconfigurable circuits 11.

Figure 2:
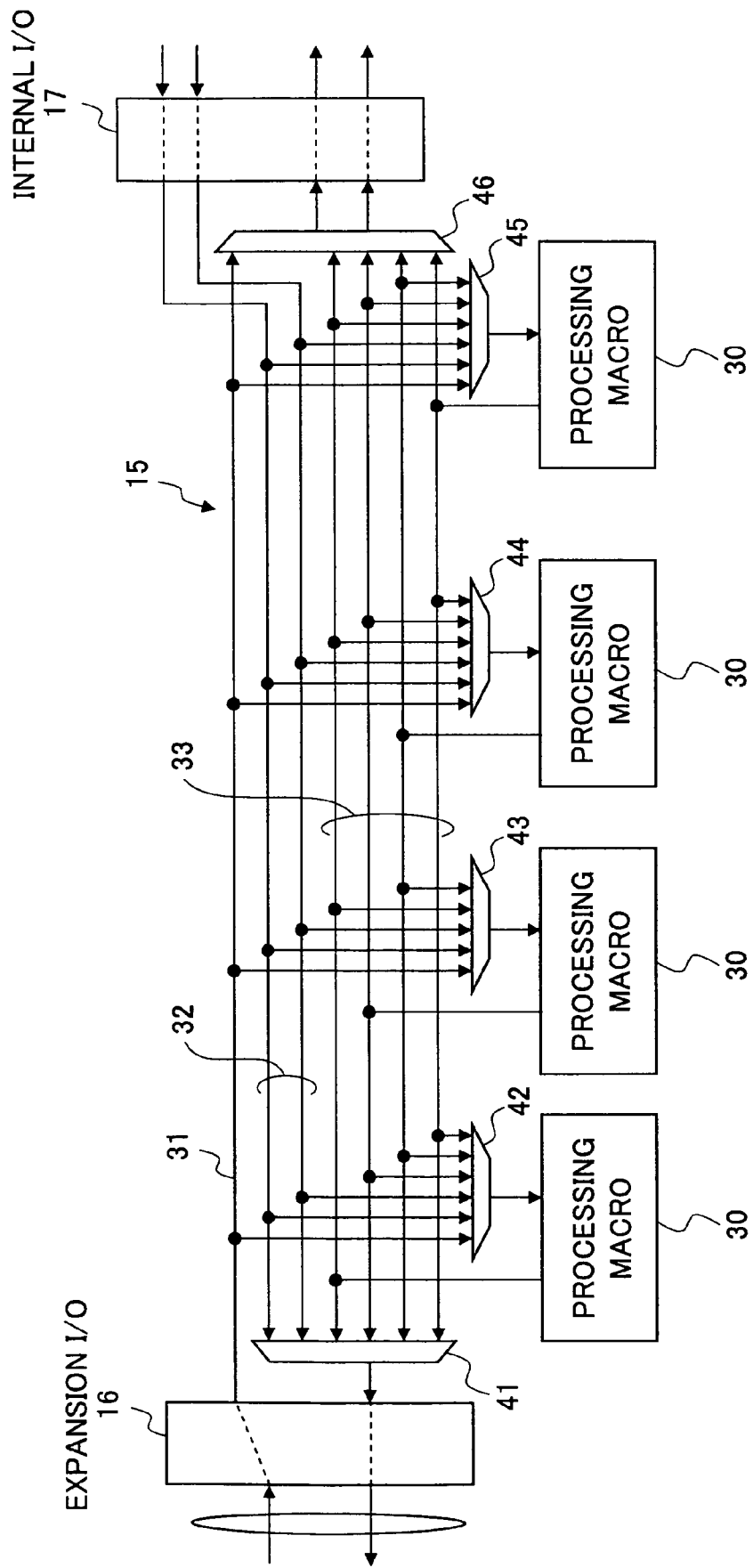
FIG. 2 is a drawing showing an example of the configuration of a network.

FIG. 2 is a drawing showing an example of the configuration of the network 15. The network 15 shown in FIG. 2 includes a signal line 31 for external expansion, signal lines 32 for inter-set connection, signal lines 33 for intra-set connection, and selectors 41 through 46. The selectors 41 through 46 may be controlled by the control circuit 14. In the example of FIG. 2, one signal line 31 for external expansion, two signal lines 32 for inter-set connection, and four signal lines 33 for intra-set connection are provided. These numbers are not a limiting example.

The signal line 31 for external expansion is coupled to an exterior of the semiconductor integrated circuit 10 via the expansion I/O 16, and receives a signal supplied from the exterior. The selector 41 selects one of the signal lines 32 for inter-set connection and the signal lines 33 for intra-set connection, and couples the selected signal line to the exterior of the semiconductor integrated circuit 10 to transmit the signal to the exterior. The expansion I/O 16 includes signal drive buffers and the like for the interface purpose, and, in terms of logic, only has the function to let signals simply pass through as shown by dotted lines.

The signal lines 32 for inter-set connection are coupled through the internal I/O 17 to an adjacent network 15 provided in the semiconductor integrated circuit 10, and receive signals supplied from this network 15. The selector 46 selects two of the signal line 31 for external expansion and the signal lines 33 for intra-set connection, and couples the two selected signal lines to the adjacent network 15 to transmit the signals to the adjacent network 15. The internal I/O 17 includes signal drive buffers and the like for the interface purpose, and, in terms of logic, only has the function to let signals simply pass through as shown by dotted lines.

The selectors 42 through 45 are provided in one-to-one correspondence with the respective processing macros 30. The selectors 42 through 45 select one of the signal line 31 for external expansion, the signal lines 32 for inter-set connection, and the signal lines 33 for intra-set connection, and supplies the signal of the selected signal line to the corresponding processing macro 30. The output of each processing macro is connected to a corresponding one of the signal lines 33 for intra-set connection. This corresponding one of the signal lines 33 is not connected to the corresponding one of the selectors 42 through 45. This is because there is no need to supply one's output as one's own input.

As shown in FIG. 2, the selector 46 is configured to couple only selected ones of the signal lines of the network 15 to an adjacent network 15. With this configuration, it is possible to fix the number of signal lines of the network 15 to a predetermined number (7 in the example of FIG. 2) even if the number of processing sets is changed. This makes it possible to provide a desired number of processing sets in the semiconductor integrated circuit 10 while avoiding an increase in the number of signal lines of the network.

By the same token, the selector 41 is configured to couple only selected ones of the signal lines of the network 15 to the exterior for the expansion purpose. With this configuration, it is possible to achieve such an expansion as to include a desired number of processing sets by connecting a desired number of semiconductor integrated circuits 10 together while avoiding an increase in the number of signal lines of the network.

Figure 3:
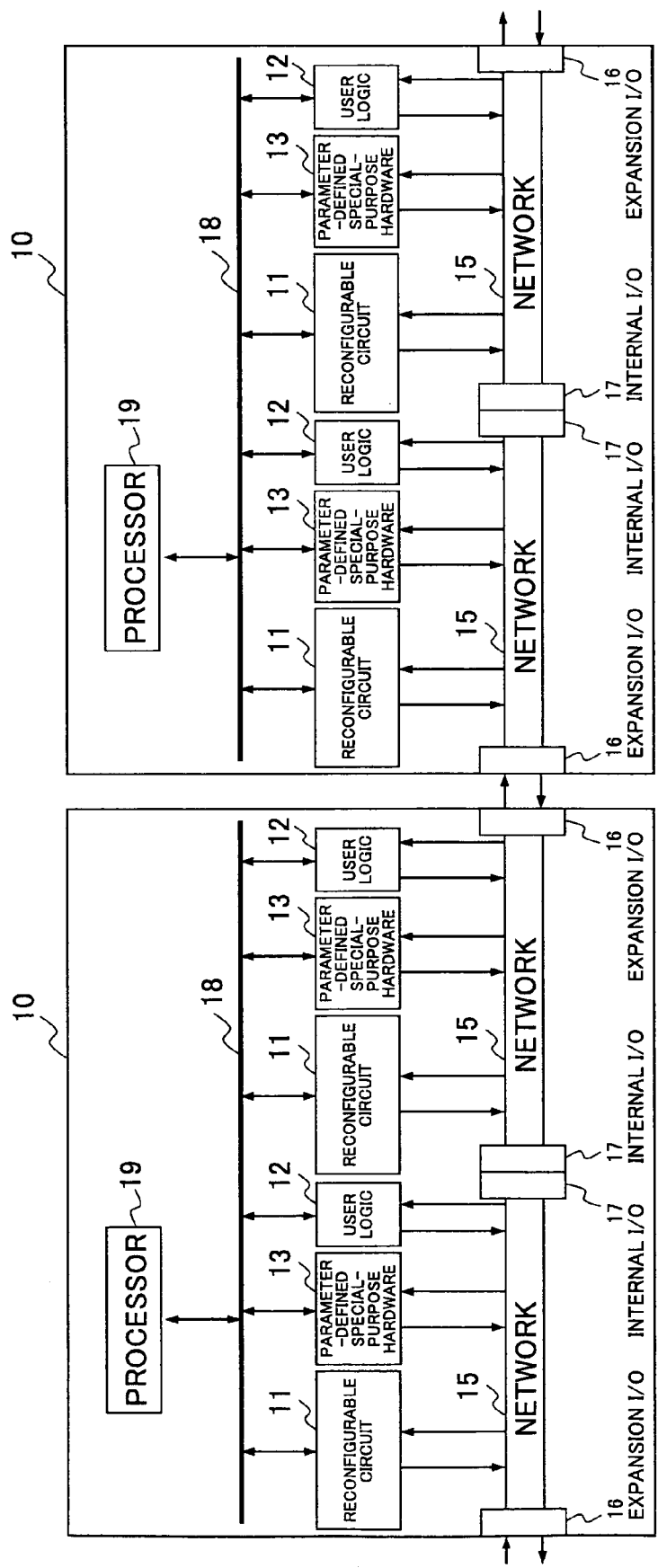
FIG. 3 is a drawing showing an example of an expanded configuration obtained by connecting a plurality of semiconductor integrated circuits together.

FIG. 3 is a drawing showing an example of an expanded configuration obtained by connecting a plurality of semiconductor integrated circuits 10 together. In FIG. 3, the same elements as those of FIG. 1 are referred to by the same numerals, and a description thereof will be omitted.

In FIG. 3, two semiconductor integrated circuits 10 are connected together, so that four processing sets in total are connected together. These four processing sets can operate together as a single circuit, thereby providing a performance level commensurate with the number of processing sets. Further semiconductor integrated circuits 10 can be connected to the two semiconductor integrated circuits 10 shown in FIG. 3. In principle, there is no limit to the number of semiconductor integrated circuits 10 and to the improvement of the performance level.

In the following, a description will be given of an example of an application of the semiconductor integrated circuit 10 in which a terminal apparatus conforming to both IEEE802.11a and IEEE802.11b is implemented by use of the semiconductor integrated circuit 10 of the present invention.

Figure 4:
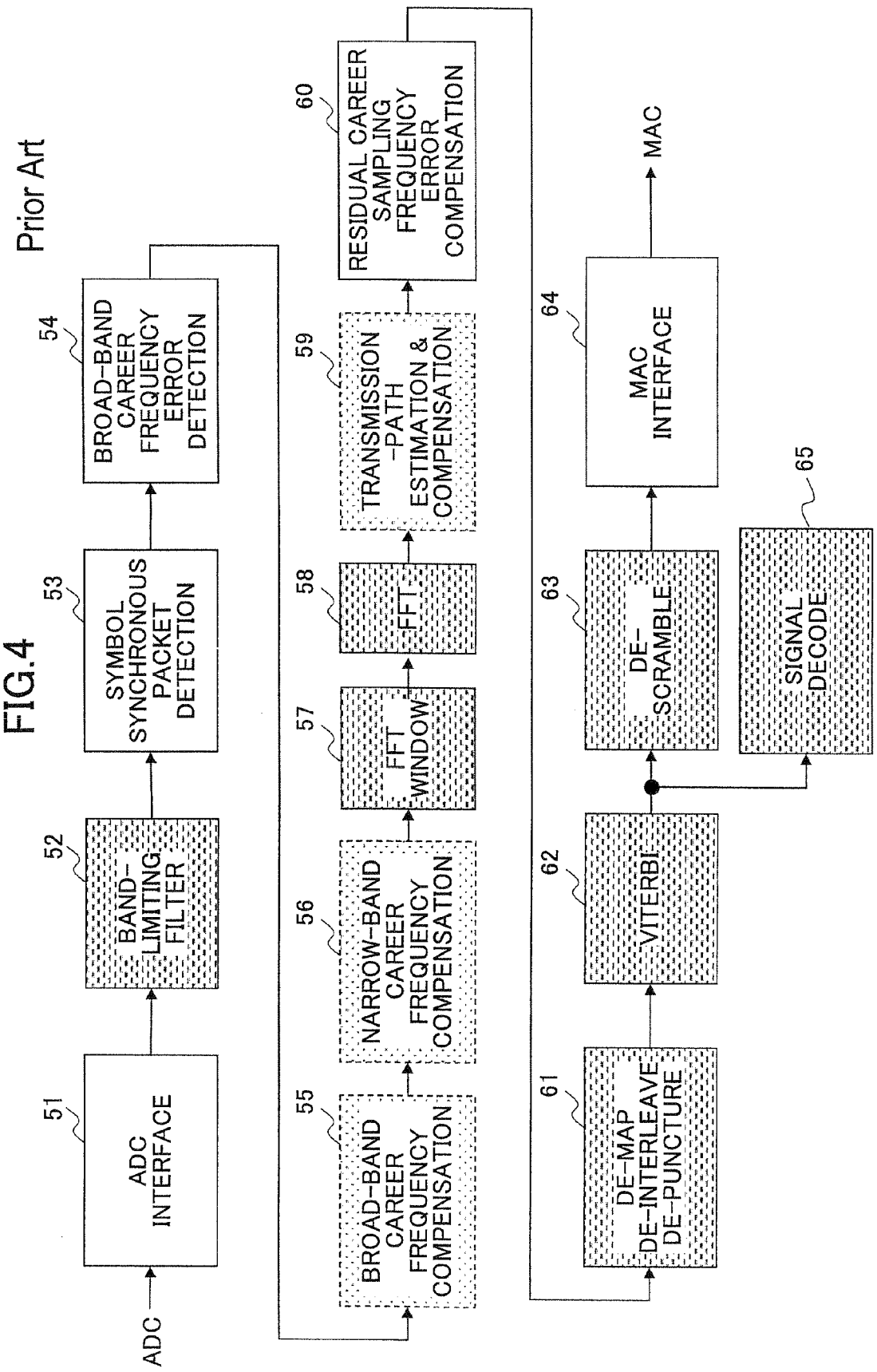
Figure 5:
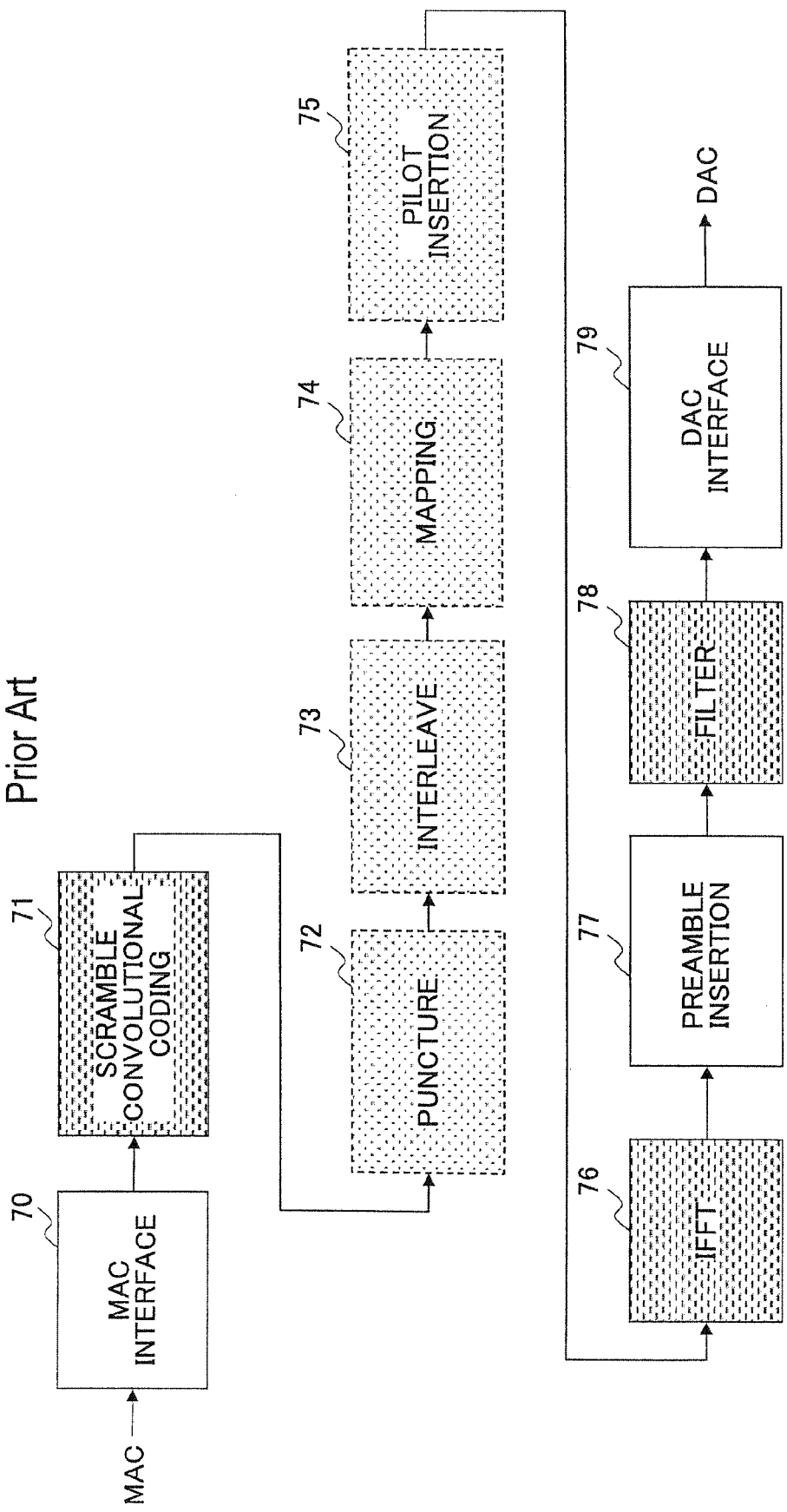

FIG. 4 is a block diagram showing the configuration of receiver functions according to IEEE802.11a. FIG. 5 is a block diagram showing the configuration of transmitter functions according to IEEE802.11a.

As shown in FIG. 4, the receiver functions according to IEEE802.11a include an ADC interface 51, a band-limiting filter 52, a symbol synchronous packet detection 53, an broad-band career frequency error detection 54, a broad-band career frequency compensation 55, a narrow-band career frequency compensation 56, an FFT window 57, an FFT 58, a transmission-path estimation & compensation 59, a residual career sampling frequency error compensation 60, a de-map de-interleave de-puncture 61, a Viterbi 62, a de-scramble 63, a MAC (Medium-Specific Access Control) interface 64, and a signal decode 65. As shown in FIG. 5, the transmitter functions according to IEEE802.11a include a MAC interface 70, a scramble convolutional coding 71, a puncture 72, an interleave 73, a mapping 74, a pilot insertion 75, an IFFT (Inverse Fast Fourier Transform) 76, a preamble insertion 77, a filter 78, and a DAC interface 79.

IEEE802.11a uses a frequency band of a 5 GHz range, and can achieve high-speed communication of 54 Mbps at maximum by using OFDM (orthogonal frequency division multiplexing) as a modulation method. The IFFT and FFT portions shown in FIG. 4 and FIG. 5 serve to perform OFDM modulation and OFDM demodulation, respectively. The MAC interfaces 64 and 70 serve to exchange signals with a host apparatus via MAC (media access control) controllers. The ADC interface 51 is an interface that receives signals from an ADC (analog-to-digital converter), and the DAC interface 79 is an interface that supplies signals to a DAC (digital-to-analog converter).

Figure 6:
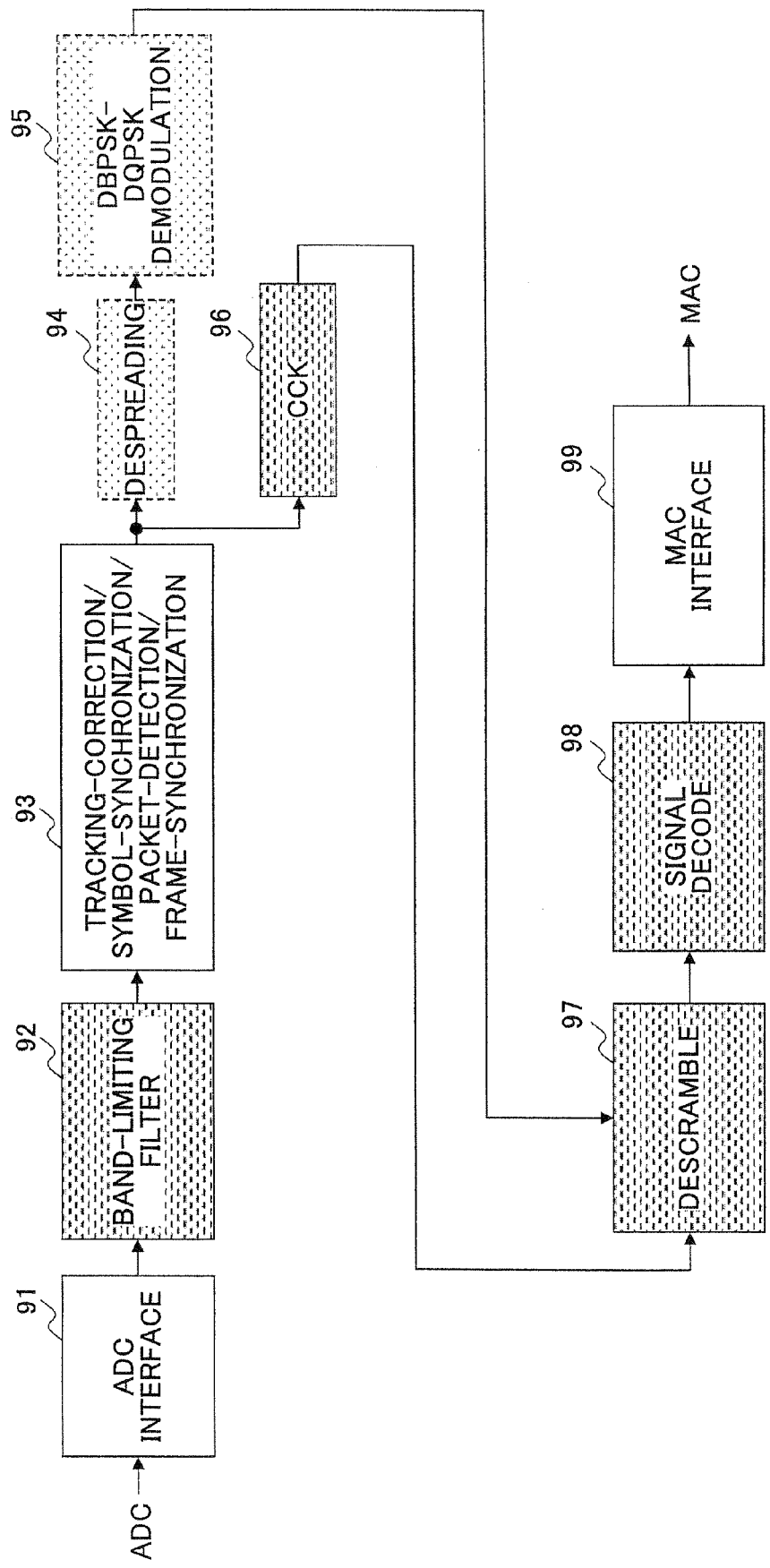
FIG. 6 is a block diagram showing the configuration of receiver functions according to IEEE802.11b.
Figure 7:
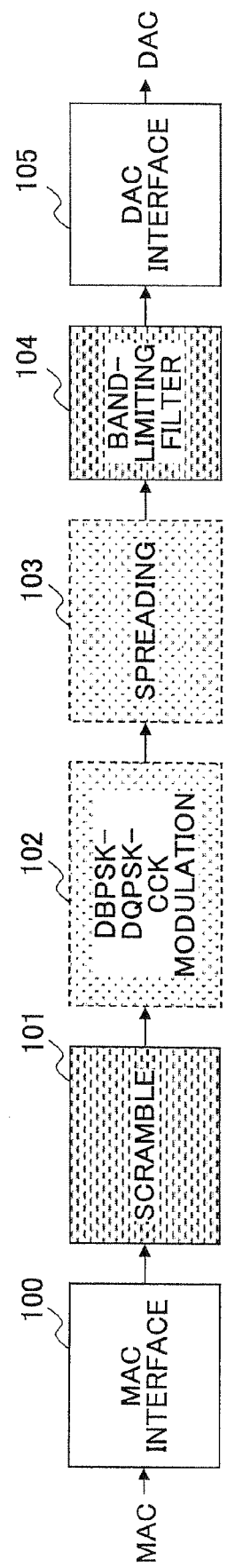
FIG. 7 is a block diagram showing the configuration of transmitter functions according to IEEE802.11b.

FIG. 6 is a block diagram showing the configuration of receiver functions according to IEEE802.11b. FIG. 7 is a block diagram showing the configuration of transmitter functions according to IEEE802.11b.

As shown in FIG. 6, the receiver functions according to IEEE802.11b include an ADC interface 91, a band-limiting filter 92, a tracking-correction/symbol-synchronization/packet-detection/frame-synchronization 93, a despreading 94, a DBPSK-DQPSK (Data Binary Phase Shift Keying-Differential Quadrature Phase Shift Keying demodulation 95, a CCK (Complementary Code Keying) 96, a descramble 97, a signal decode 98, and a MAC interface 99. As shown in FIG. 7, the transmitter functions according to IEEE802.11b include a MAC interface 100, a scramble 101, a DBPSK-DQPSK-CCK modulation 102, a spreading 103, a band-limiting filter 104, and a DAC interface 105.

IEEE802.11b uses a frequency band of a 2.4 GHz range, and can achieve communication at speed of 11 Mbps by using CCK (complementary code keying) as a modulation method and direct-sequence spectrum spreading (DS-SS) as a transmission system. The spreading 103 and despreading 94 shown in FIG. 6 and FIG. 7 serve to perform direct sequence spectrum spreading and despreading, respectively. The DBPSK-DQPSK-CCK modulation 102 and DBPSK-DQPSK demodulation 95 serve to perform modulation and demodulation, respectively. The MAC interfaces 99 and 100 serve to exchange signals with a host apparatus via MAC (media access control) controllers. The ADC interface 91 is an interface that receives signals from an ADC (analog-to-digital converter), and the DAC interface 105 is an interface that supplies signals to a DAC (digital-to-analog converter).

Figure 8:
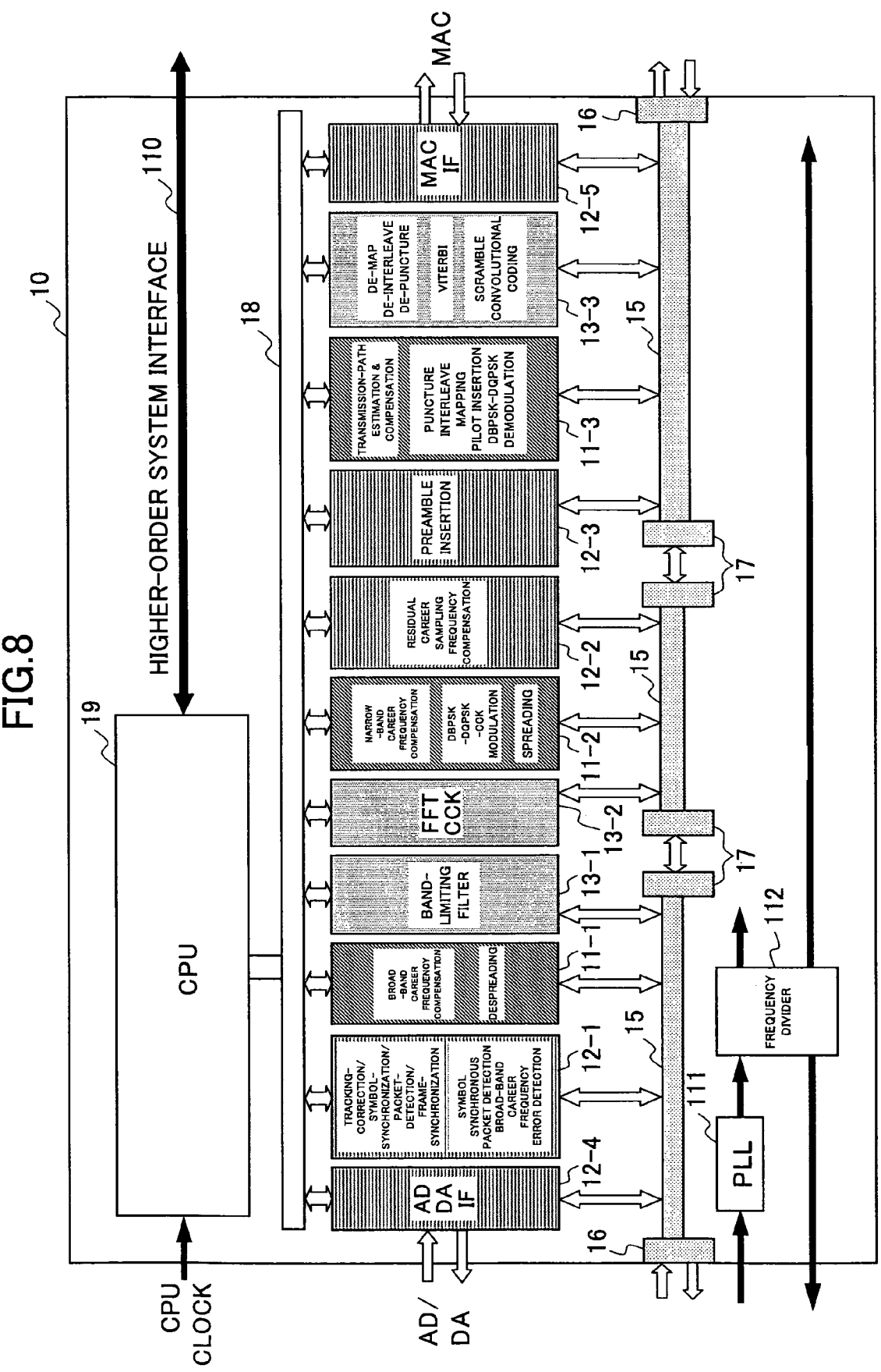
FIG. 8 is a drawing showing the configuration of the functions of IEEE802.11a shown in FIG. 4 and FIG. 5 and the functions of IEEE 802.11b shown in FIG. 6 and FIG. 7 achieved by use of the semiconductor integrated circuit of the present invention.

FIG. 8 is a drawing showing the configuration of the functions of IEEE802.11a shown in FIG. 4 and FIG. 5 and the functions of IEEE 802.11b shown in FIG. 6 and FIG. 7 achieved by use of the semiconductor integrated circuit 10 of the present invention. In FIG. 8, the same elements as those of FIG. 1 are referred to by the same numerals, and a description thereof will be omitted.

The semiconductor integrated circuit 10 shown in FIG. 8 includes a higher-order system interface 110. The higher-order system interface 110 serves to provide an interface between the processor 19 and a host system. The semiconductor integrated circuit 10 includes a PLL (phase-locked loop) 111 and a frequency divider 112. These are provided for the purpose of generating internal clock signals used in the semiconductor integrated circuit 10.

The semiconductor integrated circuit 10 of FIG. 8 includes three processing sets (i.e., three networks 15). Processing macros 11-1 through 11-3 are dynamic reconfigurable circuits, and processing macros 12-1 through 12-5 are user logic units. Further, processing macros 13-1 through 13-3 are parameter-defined special-purpose hardware units.

In the example shown in FIG. 8, the dynamic reconfigurable circuit 11-1 implements either the function of the broad-band career frequency compensation 55 shown in FIG. 4 or the function of the despreading 94 shown in FIG. 6 in a reconfigurable manner depending on which one of IEEE802.11a and IEEE802.11b is employed. The dynamic reconfigurable circuit 11-2 implements the narrow-band career frequency compensation 56 shown in FIG. 4 or the functions of the DBPSK-DQPSK-CCK modulation 102 and the spreading 103 shown in FIG. 7 in a reconfigurable manner depending on which one of IEEE802.11a and IEEE802.11b is employed. The dynamic reconfigurable circuit 11-3 implements the functions of the transmission-path estimation & compensation 59 shown in FIG. 4 as well as the puncture 72, the interleave 73, the mapping 74, and the pilot insertion 75 shown in FIG. 5 or the function of the DBPSK-DQPSK demodulation 95 shown in FIG. 6 in a reconfigurable manner depending on which one of IEEE802.11a and IEEE802.11b is employed.

Further, the user logic units 12-1 through 12-5 implement the tracking-correction/symbol-synchronization/packet-detection/frame-synchronization 93, the symbol synchronous packet detection 53, the broad-band career frequency error detection 54, the residual career sampling frequency error compensation 60, the preamble insertion 77, the ADC interfaces 51 and 91, the DAC interfaces 79 and 105, etc. Moreover, the parameter-defined special-purpose hardware units 13-1 through 13-3 implement the band-limiting filters 52 and 92, the FFT 58, the IFFT 76, the CCK 96, the de-map de-interleave de-puncture 61, the Viterbi 62, the scramble convolutional coding 71, etc.

In the assignment of functions as shown in FIG. 8, functions attainable by the parameter-defined special-purpose hardware units 13 are first assigned to the parameter-defined special-purpose hardware units 13. Among the remaining processes, those processes heavily involving heavy computations such as sum-of-product computations are then assigned to the dynamic reconfigurable circuits 11. The remaining processes are assigned to the user logic units 12. Basically, it is preferable to reduce as much as possible the size of the user logic units 12 that are fixed and not reconfigurable while preferentially utilizing the reconfigurable circuit portions such as the dynamic reconfigurable circuits 11 and/or FPGAs.

Figure 9:
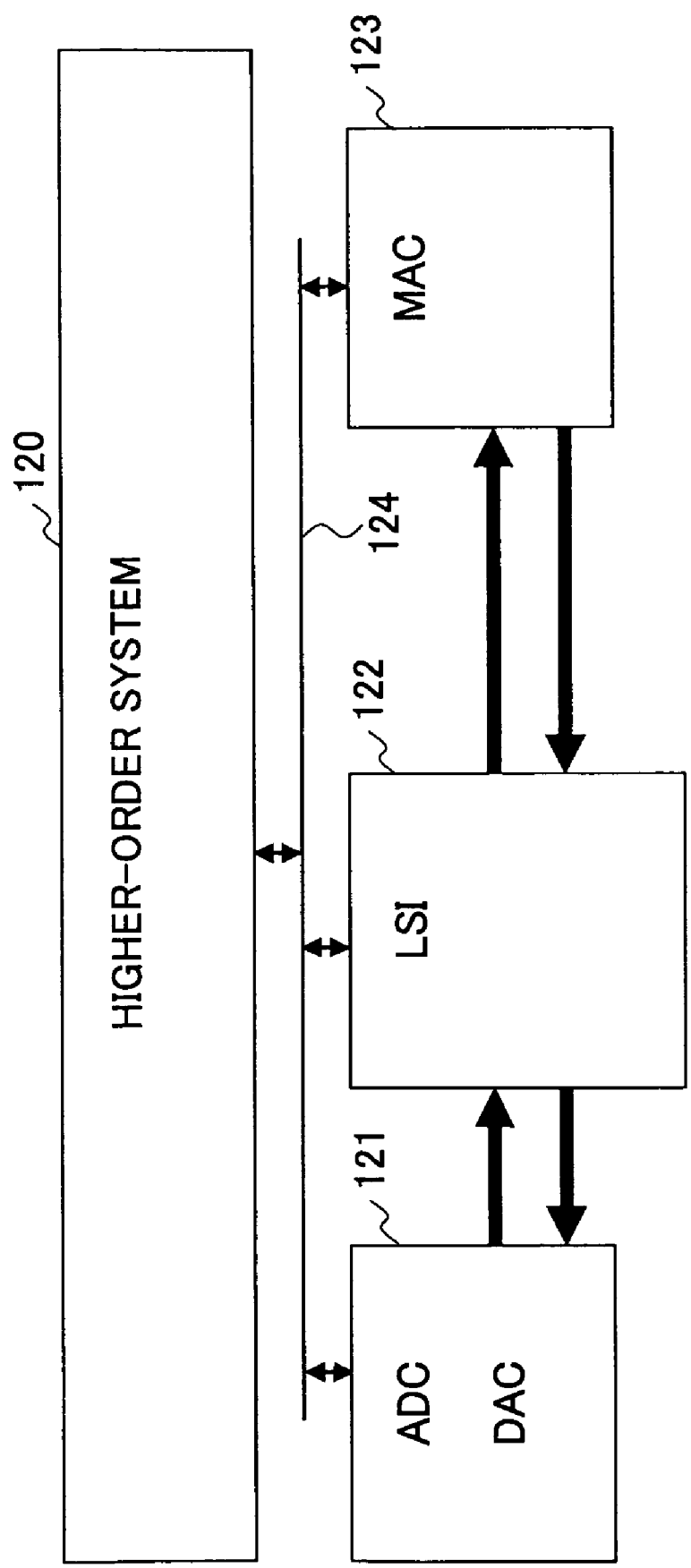
FIG. 9 is a block diagram showing the configuration of a system that uses the semiconductor integrated circuit shown in FIG. 8.

FIG. 9 is a block diagram showing the configuration of a system that uses the semiconductor integrated circuit 10 shown in FIG. 8. The system of FIG. 9 includes a higher-order system 120, an ADC/DAC 121, an LSI 122 that is the semiconductor integrated circuit 10 of FIG. 8, a MAC 123, and a bus 124. The higher-order system 120 exchanges control signals with the ADC/DAC 121, the LSI 122, and the MAC 123 through the bus 124. The AD/DA interface 12-4 shown in FIG. 8 is connected to the ADC/DAC 121, thereby achieving the exchange of data signals between the LSI 122 and the ADC/DAC 121. The MAC interface 12-5 shown in FIG. 8 is connected to the MAC 123, thereby achieving the exchange of data signals between the LSI 122 and the MAC 123.

The higher-order system 120 controls the LSI 122 via the bus 124 so as to implement in the LSI 122 either the communication functions of IEEE802.11a or the communication functions of IEEE802.11b. The higher-order system 120 further controls the ADC/DAC 121, the LSI 122, and the MAC 123 through the bus 124, thereby providing predetermined transceiver operations.

Figure 10:
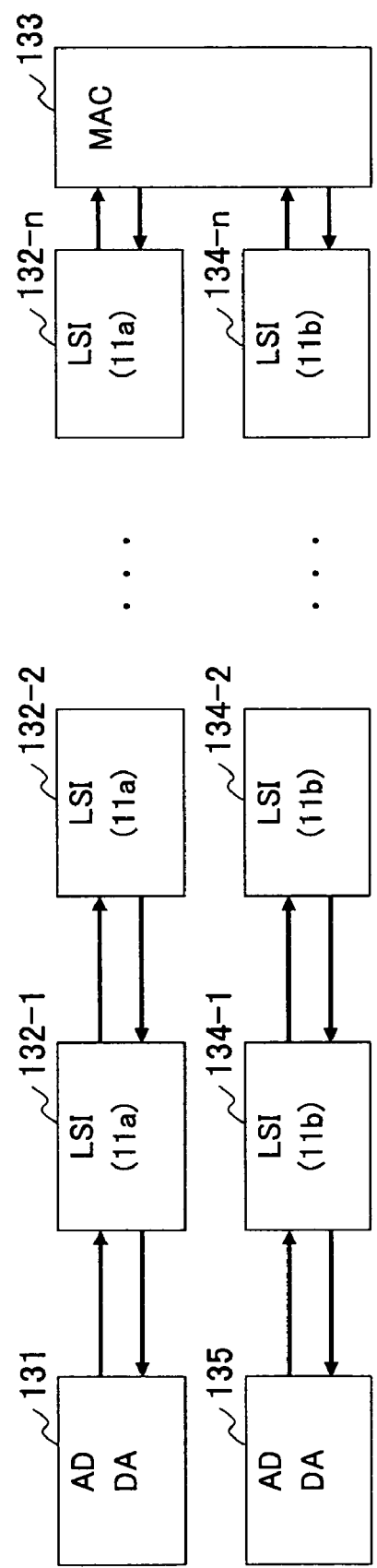
FIG. 10 is a drawing showing an example of an application of the semiconductor integrated circuit according to the present invention in which a terminal apparatus conforming to IEEE802.11g is implemented by use of the semiconductor integrated circuit.

FIG. 10 is a drawing showing an example of an application of the semiconductor integrated circuit 10 according to the present invention in which a terminal apparatus conforming to IEEE802.11g is implemented by use of the semiconductor integrated circuit 10.

The configuration of FIG. 10 includes an AD/DA converter 131, LSIs 132-1 through 132-*n* each of which is the semiconductor integrated circuit 10 of the present invention, a MAC 133, LSIs 134-1 through 134-*n* each of which is the semiconductor integrated circuit 10 of the present invention, and an AD/DA converter 135. The LSIs 132-1 through 132-*n* that are the semiconductor integrated circuits 10 are configured to implement the functions of IEEE802.11a, and the LSIs 134-1 through 134-*n* are configured to implement the functions of IEEE802.11b. Paths illustrated by the arrows extending from the AD/DA converters 131 and 135 to the MAC 133 serve to convey received signals, and paths illustrated by the arrows extending from the MAC 133 to the AD/DA converters 131 and 135 serve to convey transmission signals.

This provision achieves a terminal apparatus conforming to IEEE802.11g by use of the semiconductor integrated circuits 10 of the present invention. In the configuration shown in FIG. 10, the LSI 132-1 through 132-*n* and the LSI 134-1 through 134-*n* are each provided as many as n. This is a non-limiting example, and the number may be any number (e.g., in the configuration shown in FIG. 8, the functions of IEEE802.11a and IEEE802.11b are implemented by use of a single semiconductor integrated circuit 10).

Figure 11:
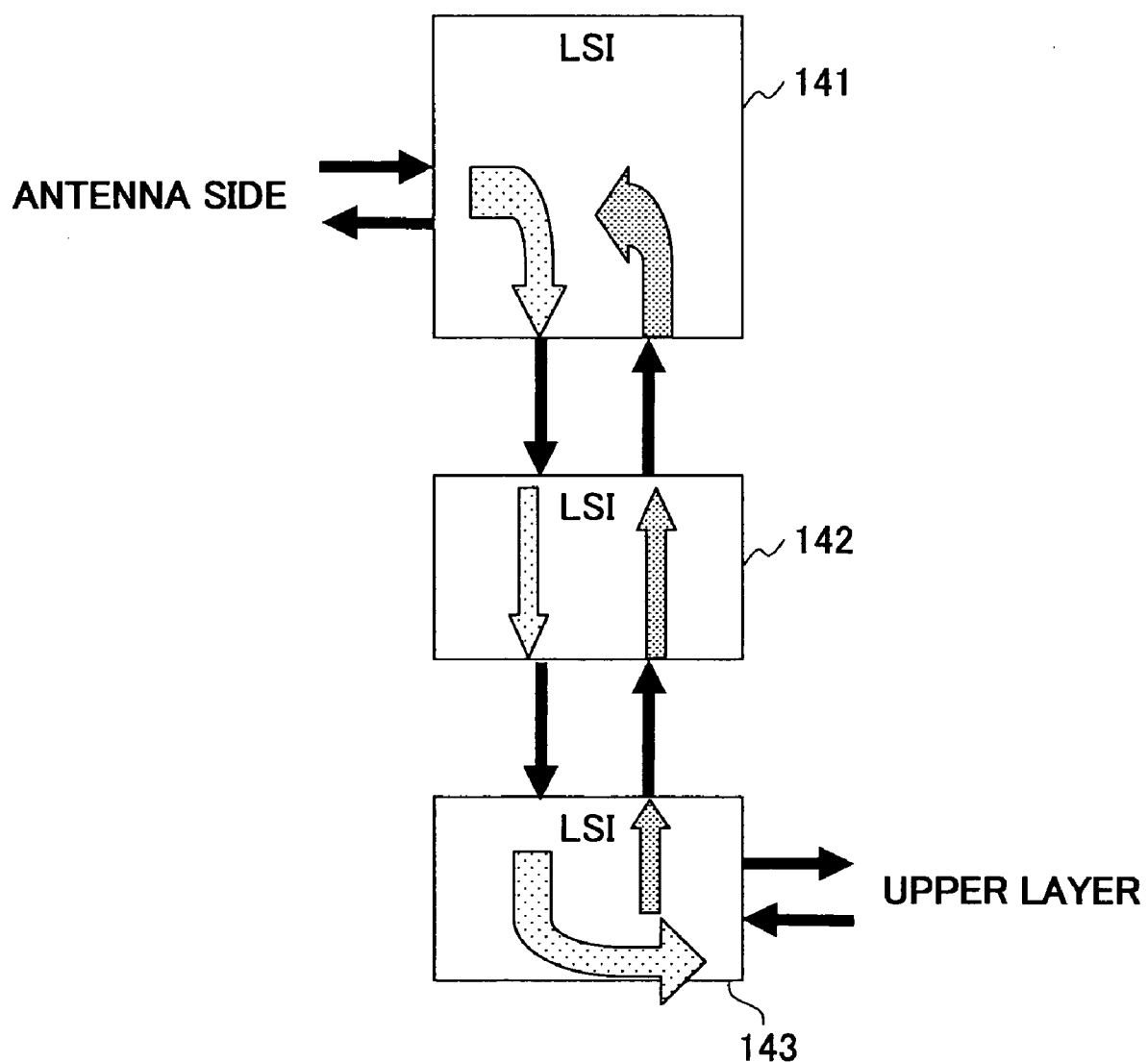
FIG. 11 is a drawing showing another example of an application of the semiconductor integrated circuit according to the present invention in which a communication system performing only one of transmission and reception at a time is implemented by use of the semiconductor integrated circuit.

FIG. 11 is a drawing showing another example of an application of the semiconductor integrated circuit 10 according to the present invention in which a communication system performing only one of transmission and reception at a time is implemented by use of the semiconductor integrated circuit 10.

The configuration shown in FIG. 11 includes a series connection of LSIs 141 through 143 each of which is the semiconductor integrated circuit 10 of the present invention. At the time of reception, received signals supplied from the antenna are processed successively by the LSI 141 serving as a master device and the LSIs 142 and 143 serving as slave devices for the expansion purpose, so that the received data obtained through the predetermined signal processing are supplied to the upper layer. At the time of transmission, transmission data supplied from the upper layer are successively processed by the LSIs 143, 142, and 141 for provision to the antenna as transmission signals.

In this manner, a plurality of semiconductor integrated circuits 10 are connected in series through the expansion I/Os 16, thereby improving overall performance for signal processing. In the case of a radio system such as a wireless LAN (Local Area Network) in which transmission and reception are not performed simultaneously, a line of semiconductor integrated circuits 10 as shown in FIG. 11 can be used for the reception purpose and for the transmission purpose alternately.

Figure 12:
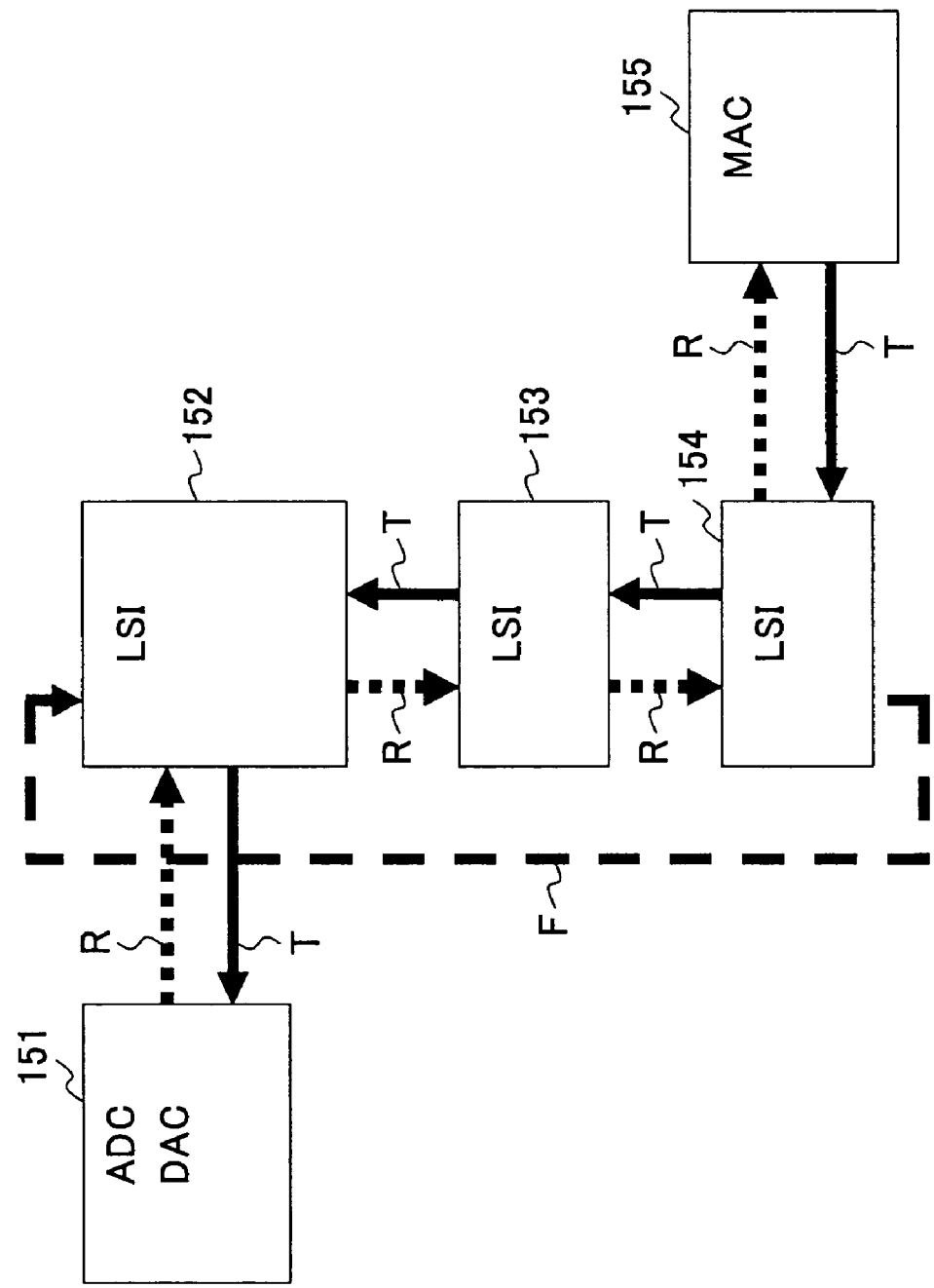
FIG. 12 is a drawing showing another example of an application of the semiconductor integrated circuit according to the present invention in which a communication system performing both transmission and reception at the same time is implemented by use of the semiconductor integrated circuit.

FIG. 12 is a drawing showing another example of an application of the semiconductor integrated circuit 10 according to the present invention in which a communication system performing both transmission and reception at the same time is implemented by use of the semiconductor integrated circuit 10.

The configuration shown in FIG. 12 includes an ADC/DAC 151, LSIs 152 through 154 each of which is the semiconductor integrated circuit 10 of the present invention, and a MAC 155. The LSIs 152 through 154 are connected in series through the expansion I/Os 16. In FIG. 12, T indicates the flow of transmission data, R the flow of received data, and F the flow of feedback control information.

In the case of a communication system such as mobile phones in which transmission is carried out while performing signal reception, there is a large amount of control information (feedback information) supplied from the upper layer to the antenna side. In the configuration shown in FIG. 12, the internal I/Os 17 are utilized to arrange the semiconductor integrated circuits 10 (LSIs 152 through 154) in series, thereby copying with the simultaneous transmission and reception as well as feedback control and also improving performance for signal processing.

Figure 13:
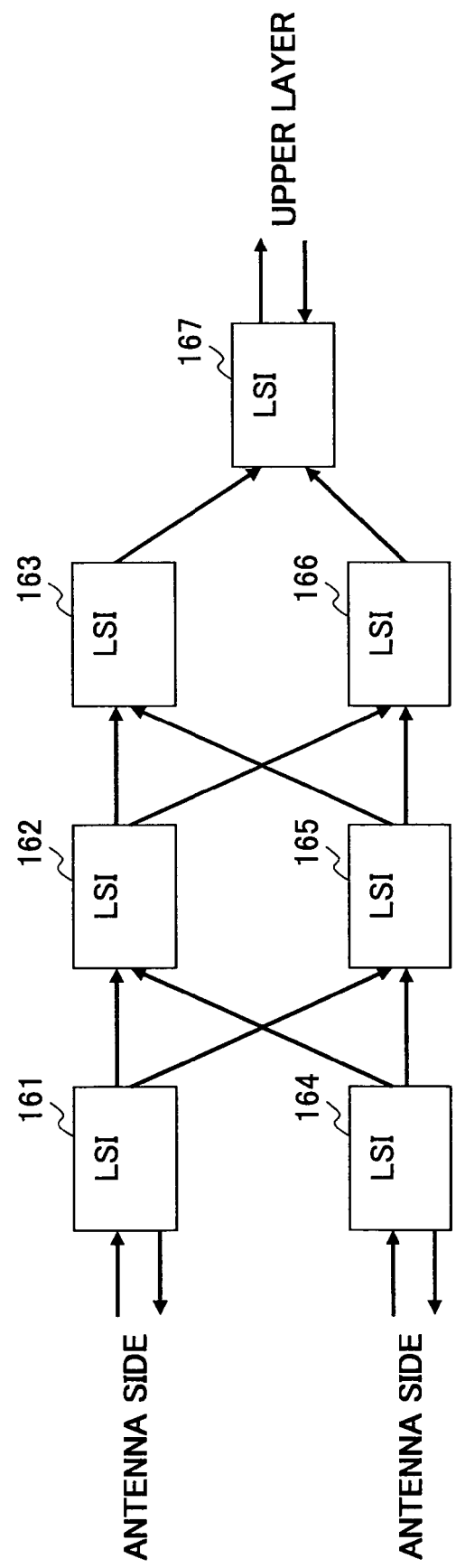
FIG. 13 is a drawing showing another example of an application of the semiconductor integrated circuit according to the present invention in which a terminal apparatus having a multi-antenna configuration is implemented by use of the semiconductor integrated circuit.

FIG. 13 is a drawing showing another example of an application of the semiconductor integrated circuit 10 according to the present invention in which a terminal apparatus having a multi-antenna configuration is implemented by use of the semiconductor integrated circuit 10. The configuration shown in FIG. 13 includes LSIs 161 through 167 each of which is the semiconductor integrated circuit 10 of the present invention.

In this example, the plurality of expansion I/Os 16 of the semiconductor integrated circuit 10 are utilized to constitute a MIMO (multi-input multi-output) for the purpose of providing a multi-antenna configuration. The MIMO serves to perform a matrix computation (i.e., the computation in which arrows indicative of the flow of signals cross each other as shown in FIG. 13). The semiconductor integrated circuit 10 of the present invention is provided with the two expansion I/Os 16, each of which has an input unit and an output unit as shown in FIG. 1 and FIG. 2. It thus follows that each semiconductor integrated circuit 10 has two inputs and two outputs. These inputs and outputs may be connected as shown in FIG. 13, thereby constituting a MIMO by use of the semiconductor integrated circuits 10 of the present invention.

Figure 14:
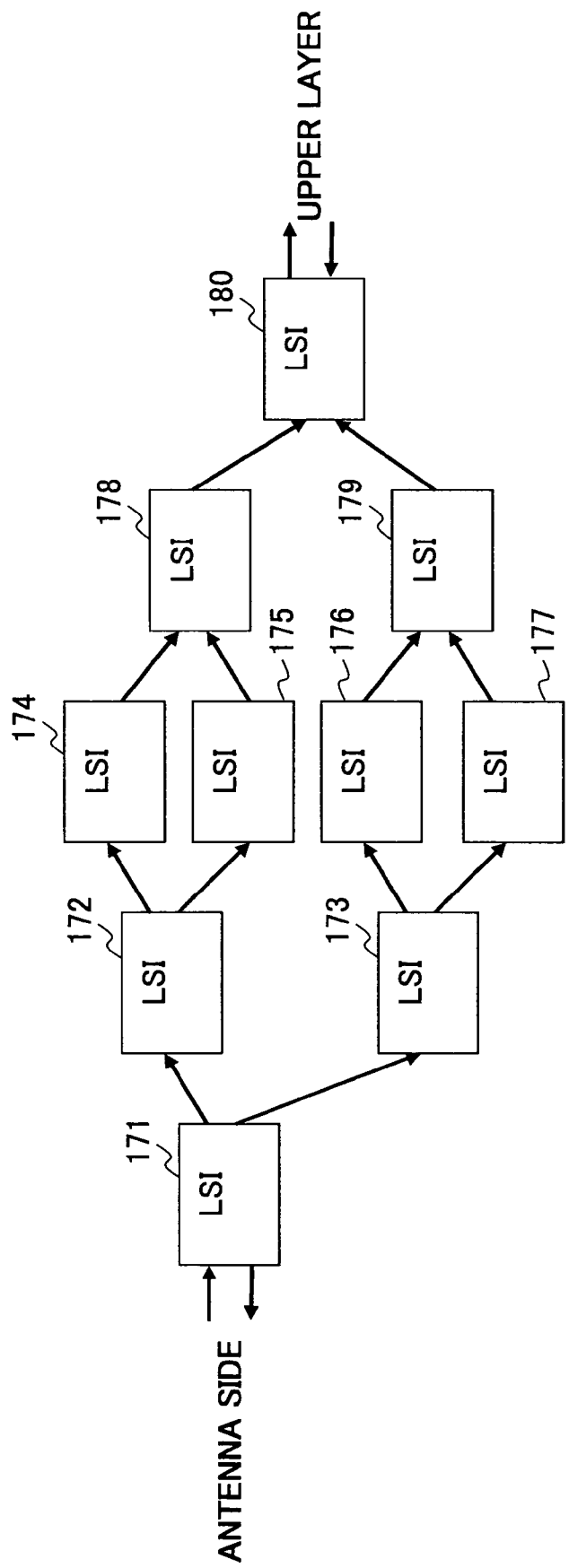
FIG. 14 is a drawing showing another example of an application of the semiconductor integrated circuit according to the present invention in which parallel processing is implemented by use of the semiconductor integrated circuit.

FIG. 14 is a drawing showing another example of an application of the semiconductor integrated circuit 10 according to the present invention in which parallel processing is implemented by use of the semiconductor integrated circuit 10. The configuration shown in FIG. 14 includes LSIs 171 through 180, each of which is the semiconductor integrated circuit 10 of the present invention.

From the first stage to the second stage on the antenna side, the two outputs of the LSI 171 are supplied to the LSI 172 and to the LSI 173, respectively. From the second stage to the third stage, the two outputs of the LSI 172 are supplied to the LSI 174 and to the LSI 175, respectively, and the two outputs of the LSI 173 are supplied to the LSI 176 and to the LSI 177, respectively. AS a result, the four semiconductor integrated circuits 10 that are LSIs 174 through 177 are provided at the third stage to perform parallel processing.

HARQ (Hybrid Automatic Repeat Request) is used in the HSDPA (High Speed Down Link Packet Access) method, for example, which is an expanded version of the 3 GPP (3rd Generation Partnership Project). This method holds received data if the received data contains error, followed by the retransmission by use of a different coding method. The retransmitted data is decoded together with the previous data, thereby improving performance. This configuration requires high performance for processing at a midpoint between the antenna and the upper layer. In the configuration shown in FIG. 14, the semiconductor integrated circuits 10 are arranged in parallel at the midpoint (the third stage), thereby satisfying such demands for processing.

Figure 15:
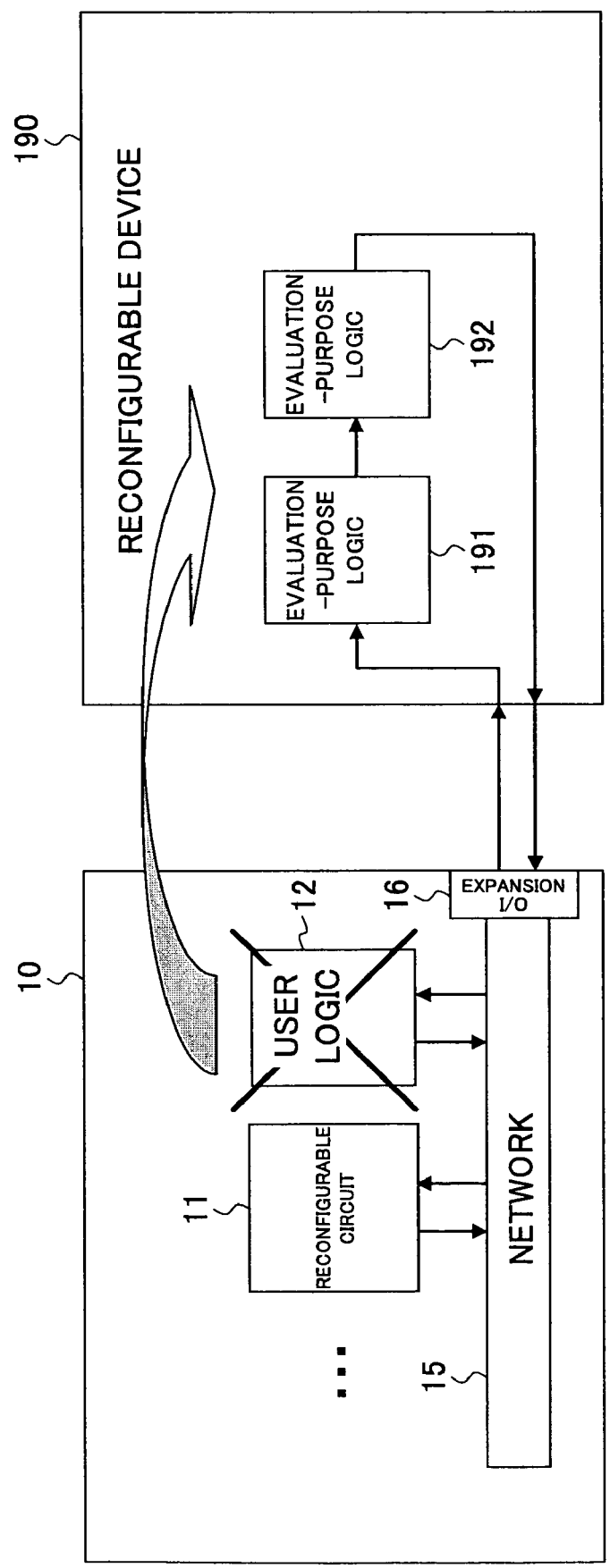
FIG. 15 is a drawing showing an example in which an expansion I/O provided in the semiconductor integrated circuit of the present invention is used to communicate with another device

FIG. 15 is a drawing showing an example in which an expansion I/O 16 provided in the semiconductor integrated circuit 10 of the present invention is used to communicate with another device. The configuration shown in FIG. 15 includes the semiconductor integrated circuit 10 and a reconfigurable device 190 such as an FPGA. The reconfigurable device 190 is connected to an expansion I/O 16 of the semiconductor integrated circuit 10. Inside the reconfigurable device 190 are provided an evaluation-purpose logic 191 and an evaluation-purpose logic 192 that implement the logic of the user logic unit 12.

In this configuration, the operation of the user logic unit 12 of the semiconductor integrated circuit 10 is halted while letting the evaluation-purpose logic 191 and evaluation-purpose logic 192 operate in place of the user logic unit 12. With this provision, it is possible to check the operation of, to evaluate, and to review the design of the user logic unit 12 in an efficient manner. In this manner, the expansion I/O 16 may have various usages in addition to its usage as a connector for connecting the semiconductor integrated circuits 10 together.

Further, the present invention is not limited to these embodiments, but various variations and modifications may be made without departing from the scope of the present invention.

The present application is based on Japanese priority application No. 2005-004403 filed on Jan. 11, 2005, with the Japanese Patent Office, the entire contents of which are hereby incorporated by reference.

What is claimed is:

1. A semiconductor integrated circuit, comprising a plurality of processing sets, each including:
   a reconfigurable circuit including a plurality of computing units interconnected in a reconfigurable manner
   a processing circuit being either a fixed logic circuit configured to perform predetermined processing or a parameter-defined special-purpose hardware unit configured to change processing specifications according to parameter settings;
   a network having reconfigurable connections and coupled to said reconfigurable circuit and to said processing circuit; and
   a first interface and a second interface each coupled to said network to provide external coupling for said network,
   wherein said networks of said plurality of processing sets are connected in series through said interfaces, and the networks situated at opposite ends of said series are connectable to an exterior of said semiconductor integrated circuit through said interfaces,
   wherein each of the networks is configured such that selected ones of the signal lines of one network corresponding to a given one of the processing sets are coupled, through one of the first interface and the second interface, to inputs of the reconfigurable circuit and the processing circuit in another one of the processing sets, the number of the selected ones of the signal lines being smaller than the number of the signal lines of the one network,
   wherein the network includes:
   a first set of one or more signal lines coupled to the reconfigurable circuit and the processing circuit and further coupled to the first interface, the first set of one or more signal lines carrying one or more signals received from the first interface;
   a second set of one or more signal lines coupled to the reconfigurable circuit and the processing circuit and further coupled to the second interface, the second set of one or more signal lines carrying one or more signals received from the second interface;
   a third set of one or more signal lines coupled to the reconfigurable circuit and the processing circuit, the third set of one or more signal lines carrying one or more signals between the reconfigurable circuit and the processing circuit;
   at least one selector configured to provide the reconfigurable connections in the network;
   a first signal-line selector configured to select a first predetermined number of signal lines from the first and third sets of one or more signal lines, and only the first predetermined number of signal lines selected by the first signal-line selector being coupled to the second interface for signal transmission for the first and third sets of one or more signal lines; and
   a second signal-line selector configured to select a second predetermined number of signal lines from the second and third sets of one or more signal lines, and only the second predetermined number of signal lines selected by the second signal-line selector being coupled to the first interface for signal transmission for the second and third sets of one or more signal lines.

2. The semiconductor integrated circuit as claimed in claim 1, further comprising:
   a bus coupled to said reconfigurable circuit and said processing circuit; and
   a processor coupled to said bus.

3. The semiconductor integrated circuit as claimed in claim 2, further comprising a control circuit configured to control the connections of said network, wherein said control circuit is configured to set the connections of said network in response to instruction supplied from said processor.

4. The semiconductor integrated circuit as claimed in claim 2, wherein said reconfigurable circuit is configured to define what computations are performed by said plurality of computing units in response to setting data supplied from said processor.

5. The semiconductor integrated circuit as claimed in claim 2, further comprising a system interface configured to couple said processor to an external system.

6. The semiconductor integrated circuit as claimed in claim 1, wherein said network includes a crossbar configured to interconnect between said reconfigurable circuit and said processing circuit.

7. The semiconductor integrated circuit as claimed in claim 1, wherein said parameter-defined special-purpose hardware unit includes:
- a special-purpose hardware configured to perform predetermined processing; and
- a setting register configured to store therein data that defines operation and processing specifications of said special-purpose hardware.

8. The semiconductor integrated circuit as claimed in claim 1, wherein said processing circuit further includes an interface configured to exchange a signal with an exterior of said semiconductor integrated circuit.

9. The semiconductor integrated circuit as claimed in claim 1 wherein outputs of the reconfigurable circuit and the processing circuit of a given set are separated by the first or second interface from outputs of the reconfigurable circuit and the processing circuit of another set.

* * * * *